United States Patent [19]

Gural

[11] Patent Number: 5,036,534
[45] Date of Patent: Jul. 30, 1991

[54] INTELLIGENT TELEPHONE INTERFACE FOR AUTOMATIC ANSWERING SYSTEMS, AND METHOD OF USING

[76] Inventor: Kenneth Gural, 7207 Dartmouth Ave., College Park, Md. 20740

[21] Appl. No.: 304,217

[22] Filed: Jan. 31, 1989

[51] Int. Cl.$^5$ .................... H04M 1/64; H04M 11/00
[52] U.S. Cl. ........................................ 379/67; 379/82; 379/93; 379/100
[58] Field of Search ................. 379/67, 88, 82, 100, 379/93, 98

[56] References Cited

U.S. PATENT DOCUMENTS

| | | | |
|---|---|---|---|
| 3,475,557 | 10/1969 | Morse et al. | 379/93 |
| 3,517,137 | 6/1970 | Ribner | 379/93 |
| 4,009,342 | 2/1979 | Fahrenschon et al. | 379/93 |
| 4,321,429 | 3/1982 | Takatsuki et al. | 379/98 |
| 4,350,848 | 9/1982 | Kariya et al. | 379/97 |
| 4,353,097 | 10/1982 | Takeda et al. | 358/287 |
| 4,392,023 | 7/1983 | Sears | 379/98 |
| 4,584,434 | 4/1986 | Hashimoto | 379/100 |
| 4,623,758 | 11/1986 | Batla et al. | 379/80 |
| 4,660,218 | 4/1987 | Hashimoto | 379/93 |
| 4,677,660 | 6/1987 | Yoshida | 379/100 |
| 4,723,268 | 2/1988 | Newell et al. | 379/98 |
| 4,746,986 | 5/1988 | Tanigawa | 358/256 |
| 4,773,080 | 9/1988 | Nakajima et al. | 375/5 |
| 4,788,714 | 11/1988 | Hashimoto | 379/74 |
| 4,800,439 | 1/1989 | Yoshino | 379/100 |
| 4,813,067 | 3/1989 | Hashimoto | 379/67 |
| 4,815,121 | 3/1989 | Yoshida | 379/67 |
| 4,821,312 | 4/1989 | Horton et al. | 379/102 |
| 4,823,375 | 4/1989 | Yoshida | 379/100 |
| 4,850,008 | 7/1989 | Berg et al. | 379/93 |
| 4,856,049 | 8/1989 | Streck | 379/67 |
| 4,868,865 | 9/1989 | Ogawa et al. | 379/100 |
| 4,879,741 | 11/1989 | Liu | 379/100 |

FOREIGN PATENT DOCUMENTS

| | | | |
|---|---|---|---|
| 0281657 | 12/1987 | Japan | 379/100 |
| 0063262 | 3/1988 | Japan | 379/100 |
| 0082156 | 4/1988 | Japan | 379/100 |
| 0148750 | 6/1988 | Japan | 379/100 |
| 0256047 | 10/1988 | Japan | 379/100 |
| WO-0007802 | 12/1987 | World Int. Prop. O. | 379/100 |

OTHER PUBLICATIONS

Panasonic KX-F120: Operating Instructions Manual, selected pages.

Primary Examiner—Thomas W. Brown

[57] ABSTRACT

Subscriber's interface enabling the connection of otherwise incompatible telephone device systems (hereinafter "(Z)") to a single telephone line, each telephone device system having devices such as: a computer modem (hereinafter "(F)"), an automatic answering machine (hereinafter "(A)"), and telephone sets (hereinafter "(T)"). When a ring signal is received from the central office, the interface allows a first device, such as (A) or (T) to answer the call, and monitors the communication between the calling party and the first device bearing in mind its various operating modes. Based on the monitored conversation, the interface determines if the call should be connected to a second device, such as (F). If so, an actuating signal is sent to (F), whereupon when (F) becomes OFF HOOK, it is connected to the telephone line. If the first device is an automatic answering machine, its various operating modes include: outgoing message, incoming message, beeperless remote mode. If the first device is a remotely located telephone set, its various modes of operation include simple human voice signals and complex human voice signals.

30 Claims, 8 Drawing Sheets

INTELLIGENT TELEPHONE INTERFACE FOR AUTOMATIC ANSWERING SYSTEMS, AND METHOD OF USING

BACKGROUND OF THE INVENTION

As facsimile machines and other automatic computer modem devices attachable to public telephone lines become less expensive and increasingly more prevalant in small businesses, there is an increasing need for means to enable the computer apparatus (F) to share a single telephone line with other telephone devices such as an automatic answering machine (A) and additional telephone sets (T).

Among facsimile (fax) machines, the most popular systems have associated telephone sets, comprising either connection means to enable a nearby telephone set to be connected to the fax (F-T), or having the telephone set actually incorporated in the housing of the fax (FT). The reason for this popularity is probably due to the fact that fax machines are usually connected to dedicated telephone lines not having additional telephone sets associated therewith. Thus, in order to carry out a voice conversation, it is necessary to have a (T) device associated with the (F) device. Such systems, however, do not allow connection of additional telephone devices such as an automatic answering machine (A) or additional remotely located telephone sets (T) to the same telephone line. If an automatic answering machine (A) is connected to the telephone line, there is no way to decide whether (A) or (F) should respond to a call. If a remotely located telephone set (T') is connected to the same telephone line, there is no way to actuate (F) from the remote location, if the call turns out to be for (F).

A number of other systems have been proposed in the past in an effort to allow various combinations of incompatible telephone devices to be connected to the same telephone line, such as the following systems:

Integrated fax and answering machine systems (with or without an additional telephone set—(FA) or (FAT));

Fax systems allowing an answering machine to be attached (F-A) or (FT-A);

Interface units such as private branch exchange (PBX)-type switching systems enabling the user to actuate a selected one of these or other devices by typing additional DTMF codes (I-F-A). DTMF codes are voice-frequency electronic signals commonly known under the trademark TOUCH-TONE.

Many of these systems have proven commercially sucessful due to the strong need for solutions to this problem; however, these systems also have drawbacks. For example, the integrated (FA) or (FAT) systems such as the model KX-F120 built by PANASONIC Corp. suffer from the limitation that a user is unable to select (A) and (F) independently. This is an important consideration, because a user may favor an answering machine having a certain set of operating parameters, which may be unavailable in combination with the fax of his choice. A company may manufacture 5 different (A)'s and 5 different (F)'s, but to have the same degree of flexibility, would need to manufacture 25 different (FA)'s. In addition, some of these systems do not support the connection of additional telephone sets (T') to the same telephone line.

Some of the systems providing (F) and (A) capabilities operate by letting (F) answer first, others by letting (A) answer first, still others by letting an interface unit (if there is one) answer first. A system wherein the (F) answers first is described in U.S. Pat. No. 4,677,660 to T. Yoshida. After (F) answers, it sends out the CED and GI2 signals, waiting for a response from a calling machine. After a timeout period, if the calling party has not sent the appropriate response, the fax machine actuates the ringing of the telephone apparatus in order that voice communication may be established.

A system wherein (A) answers first is described in U.S. Pat. No. 4,584,434 to K. Hashimoto. The disclosed system includes means to allow the answering machine (TAD) to answer the ring signal, and additional means to sense DTMF signals arriving from the calling party. A proper combination of DTMF signals will actuate switching means to enable the (F) to be connected to the telephone line and (A) to be disconnected from the telephone line. In order to actuate (F), a ring generating circuit is initially connected to (F). Thus, the system of Hashimoto may be viewed as a type of private branch exchange (PBX). PBX-type switching systems suffer from the necessity for the calling party to perform additional operations normally unnecessary for operation of the individual units attached to the PBX system. For example, some automatically dialing fax machines without complicated trial and error programming would be unable to properly actuate the fax machine in the disclosed Hashimoto system because they are unable to automatically know when to issue the DTMF control signals necessary to connect the receiving fax machine to the telephone line.

Additional systems considered useful in understanding the background and scope of the present invention are described in the following U.S. patents:

| | | |
|---|---|---|
| 4,723,268 | D. Newell et al | 2/02/88 |
| 4,660,218 | K. Hashimoto | 4/21/87 |
| 4,623,758 | M. Batla et al | 11/18/86 |
| 4,392,023 | M. Sears | 7/05/83 |
| 4,353,097 | T. Takeda et al | 10/05/82 |
| 4,350,848 | M. Kariya et al | 9/21/82 |
| 4,321,429 | T. Takatsuki et al | 3/23/82 |
| 4,009,342 | F. Fahrenschon et al | 2/22/77 |
| 3,517,137 | M. Ribner | 6/23/70 |
| 3,475,557 | C. Morse et al | 10/28/69 |

None of these references, taken individually or in combination, is considered to exhibit the beneficial features and advantages afforded by the instant invention.

Therefore, an object of this invention is to enable any of a large selection of otherwise incompatible (F), (A), and (T) telephone devices to be connected to a single telephone line in such a manner as to ensure harmonious operation of each of the devices.

Another object of the invention is to enable the composite system to operate such that with respect to a first device, the presence of the additional devices is virtually invisible. In other words, the modes and methods of operating the first device when connected in the composite system will be essentially the same as the modes and methods of operating the same device without the composite system and additional devices.

Another object of the invention is to provide a universal interface capable of connecting a variety of (F), (A), and (T) devices of diverse manufacturers to a single telephone line, without requiring a plurality of interface apparatus designed specifically for an individual model or make of (F), (A), or (T) device.

Another object of the invention is to accomplish the above objects with an inexpensive electronic interface that compares favorably with the long term cost of adding additional telephone lines for each of the normally incompatible devices.

These and further objects and features of the invention will become apparent from the following detailed description of preferred embodiments thereof taken in conjunction with the accompanying drawings.

SUMMARY OF THE INVENTION

Subscriber's interface enabling the connection of otherwise incompatible telephone device systems (hereinafter "(Z)") to a single telephone line, each telephone device system having devices such as: a computer modem (hereinafter "(F)"), an automatic answering machine (hereinafter "(A)"), and telephone sets (hereinafter "(T)"). When a ring signal is received from the central office, the interface allows a first device, such as (A) or (T) to answer the call, and monitors the communication between the calling party and the first device bearing in mind its various operating modes. Based on the monitored conversation, the interface determines if the call should be connected to a second device, such as (F). If so, an actuating signal is sent to (F), whereupon when (F) becomes OFF HOOK, it is connected to the telephone line. If the first device is an automatic answering machine, its various operating modes include: outgoing message, incoming message, beeperless remote mode. If the first device is a remotely located telephone set, its various modes of operation include simple human voice signals and complex human voice signals.

BRIEF DESCRIPTION OF THE DRAWINGS

FIGS. 2-4 schematically show the standard operating modes of conventional telephone equipment: FIG. 2 for an answering machine receiving a voice message, FIG. 3 for an answering machine in beeperless remote mode, FIG. 4 for a facsimile machine.

DETAILED DESCRIPTION OF THE PREFERRED EMBODIMENTS

Figure 1A:
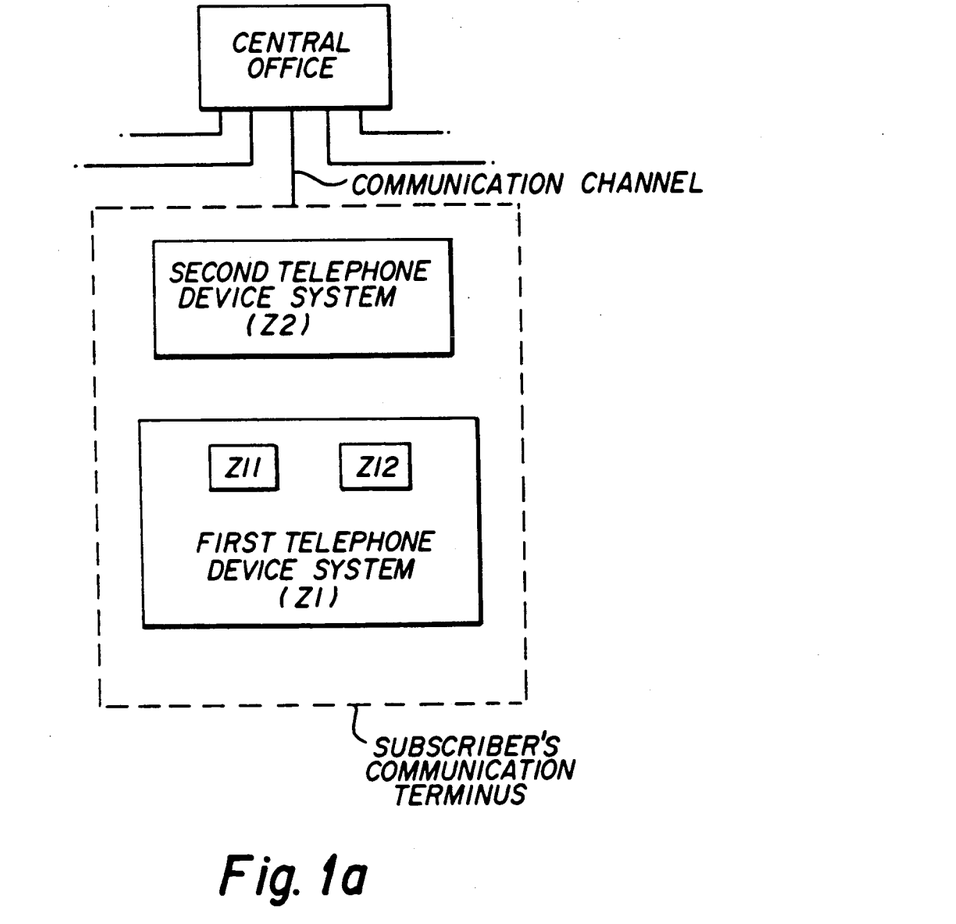
FIG. 1a is a block diagram representing schematically a subscriber's communication terminus connected to a central office.
Figure 1B:
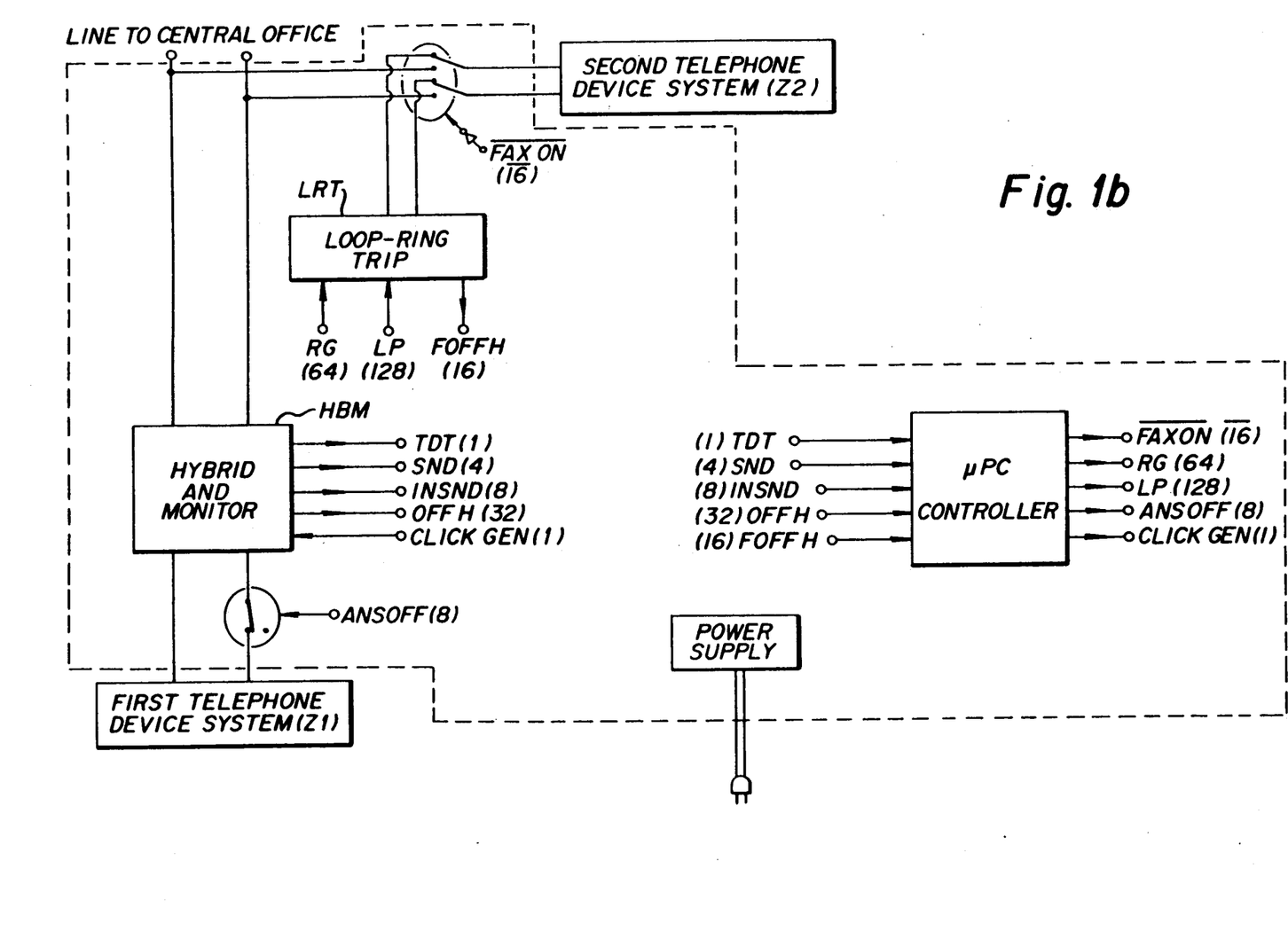
FIG. 1b is a block diagram of one embodiment of the present invention.

FIG. 1a shows a subscriber's communication terminus comprising a plurality of telephone device systems (Z1), (Z2), (Z11), (Z12) connected to a central office over a communication channel. FIG. 1b shows in block form a preferred embodiment of the invention wherein two telephone device systems (Z1) and (Z2), which may include respectively an automatic answering machine (A) and a computer modem such as a fax machine (F), are connected to a single telephone line L. When no call is active, (Z2) is isolated from the line L by DPDT switch FAXON and instead connected to a loop and ring block LRT. Device (Z1), by contrast, is normally connected to the line through a hybrid and monitor circuit HBM and normally closed switch ANSOFF. A microcontroller monitors the signals from the loop-ring block and from the hybrid and monitor block, and provides control signals to actuate the switches FAXON and ANSOFF (and other control actions) in response to the conversation occuring on the telephone line.

Figure 2:
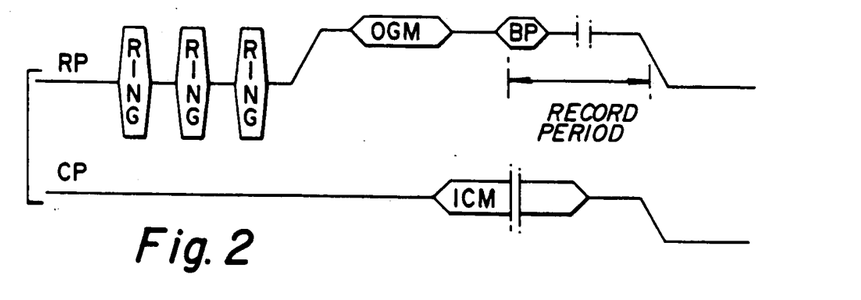
Figure 3:
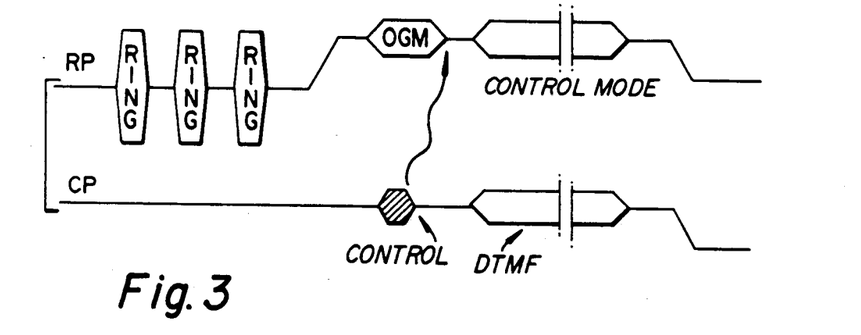
Figure 4:
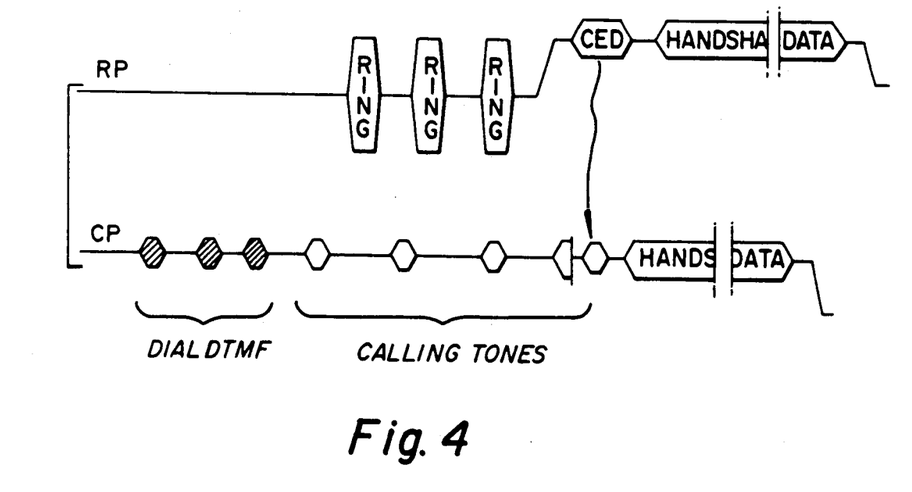

The detailed operation of the above blocks will become more apparent upon consideration of the normal operating modes of (A) and (F), as shown in FIGS. 2-4. In each of these figures, the signals ariving from the calling party (CP) are shown schematically in the lower trace while the signals transmitted by the receiving party (RP) are shown schematically in the upper trace.

The normal answering machine mode is shown in FIG. 2. After CP has sent the dialing signals to its central office (not shown in FIG. 2), a series of actuating ring signals arrives at RP, whereupon RP becomes OFF HOOK, as indicated by a rise in loop current (and positive rise in line voltage). After a short pause, the outgoing message (OGM) is sent by (A), terminated by a tone signal that indicates to CP to begin leaving its incoming message (ICM) which is recorded by (A). After a specified period of time, or whenever CP finishes speaking or hangs up, (A) suspends recording and becomes ON HOOK, as indicated by a drop in loop current (and negative increase in line voltage).

Most answering machine units manufactured today also include an additional mode of operation to enable the owner to retrieve messages from a remote location, as indicated in FIG. 3. During OGM, the user sends one or more control tones which are detected by (A), whereupon the OGM is terminated and the remote control mode begins. The control tones are most commonly the DTMF signals available on many pay-telephones, comprising a combination of two sine waves of incommensurate frequencies and specified intensity ratio. During the control mode, the user may transmit a plurality of control signals to perform a variety of control operations, interactively upon prompting by (A). Finally, after the control operations are completed, the user terminates the conversation and (A) becomes ON HOOK.

The typical operating mode of a calling computer modem or fax machine (F) is indicated in FIG. 4. If the calling party is using an (F) that automatically dials, the CP-F places the DTMF signals on the telephone line, and may continue to emit a series of calling tones spaced several seconds apart, as indicated in the lower trace. Meanwhile, the call continues through the switching exchanges, until the receiving party fax (RP-F) receives a series of ring signals, whereupon it becomes OFF HOOK and begins the conversation by emitting the CED signal (2100 Hz) or additional voice-frequency signals. Upon hearing the CED or other signals, CP-F ceases emitting the calling tones, and begins exchanging a series of handshake signals with RP-F, followed by the transmission of data. When the data conversation is completed, RP and CP become ON HOOK.

If the calling party is using a manually dialing (F), a human operator must manually dial RP's telephone number and wait for the CED or other signal sent from RP-F when it becomes OFF HOOK before releasing the CP-F to continue its data transmission. In this case, the calling tones indicated in FIG. 4 are usually not present. Some automatically dialing (F) devices also do not send the calling tones.

Based upon the above understanding of normal operating modes of the (A) and (F) units, the operation of the invention may be further explored. The essential nature of the invention is to let one of the telephone devices (e.g., (Z1)) answer the calling signal, and to monitor the conversation bearing in mind the various operating modes of (A) until it becomes apparent to the interface that the wrong device has answered; thereupon to generate an actuating signal to actuate the other device and connect it to the telephone line (and also to isolate the first device from the line, if desired).

In the embodiment of the invention developed to handle an automatic answering machine (A) as the first device to answer, the interface monitors the telephone line during OGM for at least three signals—a calling tone, indicating an automatic (F) is calling; a DTMF control tone, indicating the user is initiating the control mode from a remote location; or the beep occurring at the end of OGM, indicating the end of the OGM and the initiation of the ICM mode. If the calling tones are received, the interface waits for termination of the OGM and switches the call to (Z2). If DTMF control tones are received, the interface assumes the DTMF tones are for the purpose of entering the beeperless remote mode of operation, and takes no further switching action during the remainder of the telephone call. If the beep at the end of OGM is detected, then the interface knows the answering machine has entered ICM mode, and begins to monitor for the ICM set of conditions.

During the ICM period, the interface monitors the telephone lines for two signals—a calling tone, indicating an automatic (F) is calling (in case the calling tone was obscured by the OGM); or voices, indicating normal operation of (A). If only silence is received for a short period of time (e.g., 3 seconds), the interface assumes the CP is a manual or automatic (F), and activates (Z2).

Thus, to a calling party wishing to leave a voice message, the presence of the interface unit and (Z2) are entirely invisible, provided the voice message begins sufficiently soon after the OGM beep; that is, before the interface decides the calling party is an (F) and switches in RP-F. To the user wishing to send remote commands to (A), the presence of the interface and (Z2) are entirely invisible. To the automatic dialing (F), the presence of the interface and (Z1) are minor, giving the appearance essentially of additional noise on the telephone line. To the manual dialing (F), the presence of the interface and (Z1) requires simply that the calling party wait an additional period of time for the OGM to finish before pressing the start button on LP-F; and may in fact provide the benefit of a friendly (recorded) human greeting prior to initiation of the (Z2) communication. Thus, in the normal operating modes of (F) and (Z1), the instant invention allows each of the normally incompatible units to be connected to the telephone line while being essentially invisible to the presence of the others.

Figure 5:
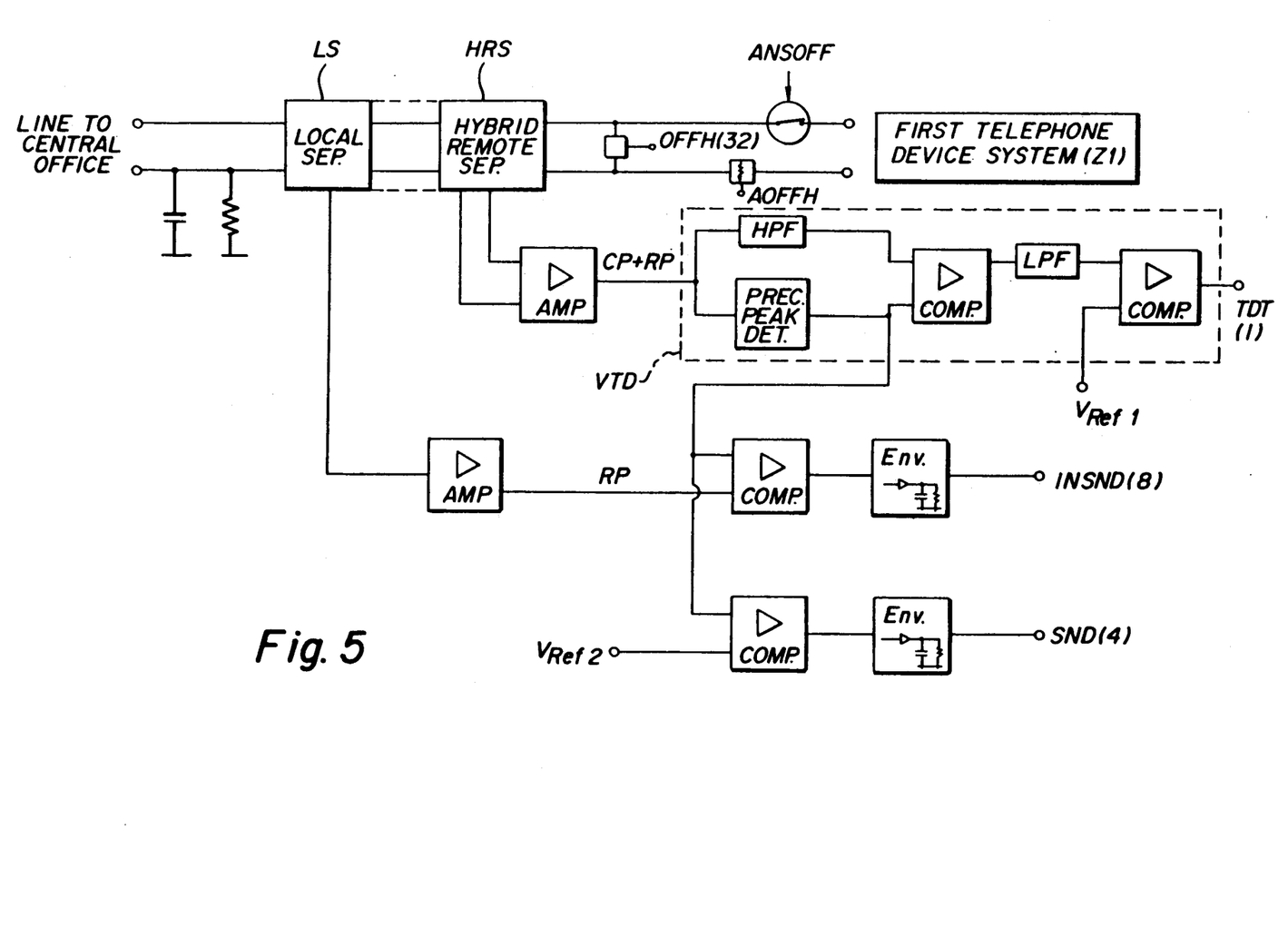
FIGS. 5 and 6 show in increasing detail one embodiment of portions of the circuit of FIG. 1.

A system as described generally above was constructed in order to test the viability of the proposed invention. The circuit developed to enact the hybrid and monitor block HBM is shown in FIG. 5, and in more detail in FIG. 6. Connected between the telephone line and (Z1) is a hybrid circuit for separating the signals arising from CP and from RP. Because it is necessary to detect tones arising both from CP (the calling tones) and from RP (the beep at the end of the OGM), a composite signal CP+RP is taken from the hybrid HRS, amplified, and then sent to the voice/tone discriminator. The voice/tone discriminator VTD comprises a comparator comparing on the one hand a partial bandwidth (high frequencies) of the incoming signal, and on the other hand a fraction of the envelope of the incoming signal; followed by a low pass filter and a threshold comparison to create the signal TDT (tone detect). Because voice signals comprise a plurality of frequencies, the energy of only a portion of the bandwidth has a much smaller ratio to the entire bandwidth than does a signal comprising a single frequency signal such as the calling tones emitted by a calling fax or the beep at the end of the OGM. In fact for suitable settings of the envelope ratio and the discriminator threshold, the circuit shown was found also to discriminate between simple tones and DTMF signals.

Figure 6:
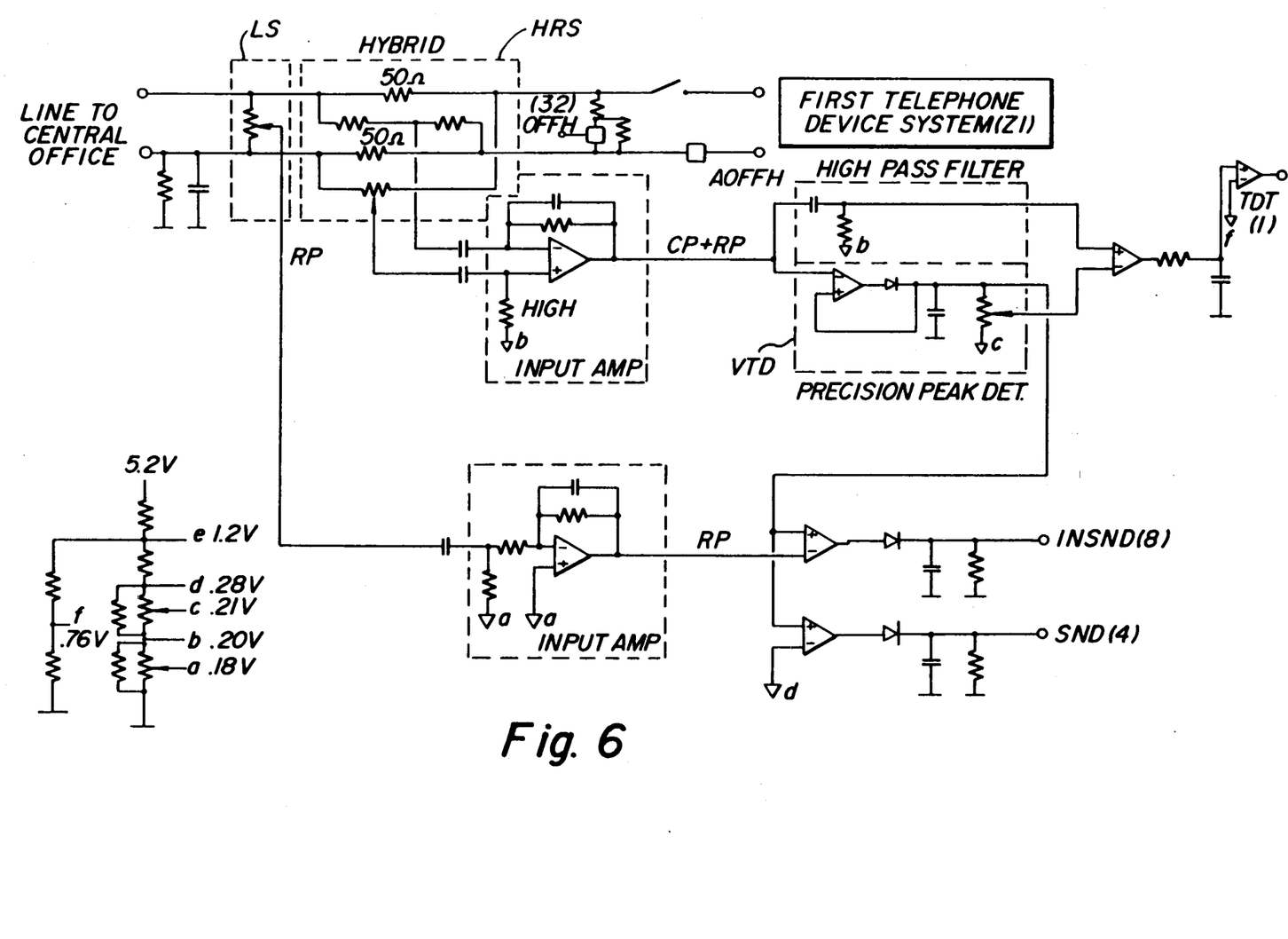

The other signal (RP) from the hybrid, derived by local separator LS, is amplified and compared with the envelope of the CP+RP signal plus a small offset bias. When mainly CP is present, then (CP+RP)>RP+offset. This signal is further developed into the signal INSND. A further signal SND is derived from the envelope of CP+RP. A signal OFF HOOK is created by sensing the voltage across the telephone line by bi-directional optoisolator means.

Figure 7:
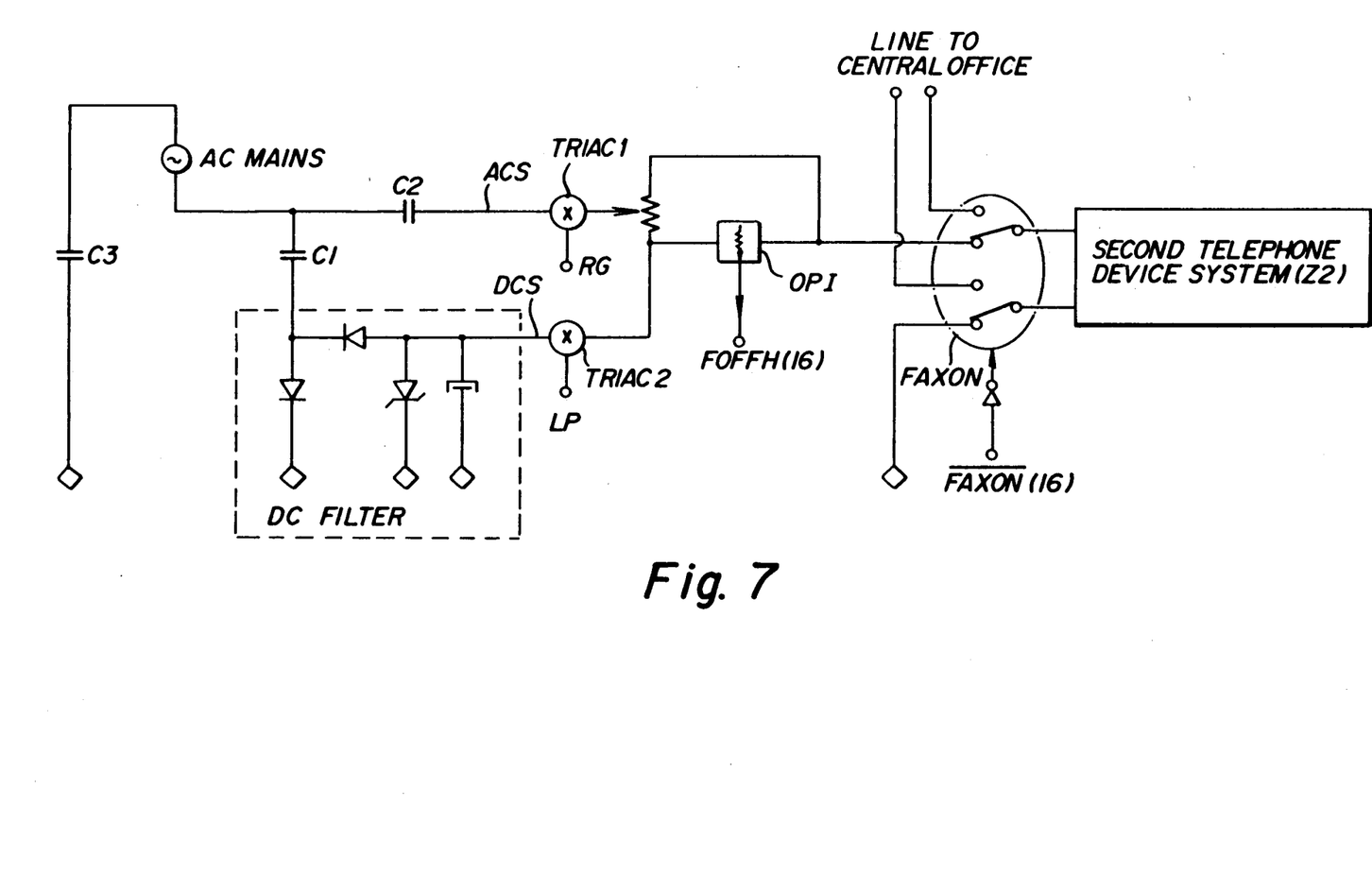
FIG. 7 shows in increased detail one embodiment of other portions of the circuit of FIG. 1.

The loop-ring circuit (FIG. 7) developed for an embodiment of this invention comprises a high-voltage AC source ACS for the ring current and a low voltage DC source DCS for the loop current, alternately switched by optically triggered triacs TRIAC1, TRIAC2 under control of the signals RG and LP of the microcontroller. In series with this current supply is a bi-directional optoisolator OP1 producing the trip signal FOFFH when (Z2) becomes OFF HOOK, and a DPDT switch FAXON for connecting (Z2) with the telephone line when (Z2) becomes OFF HOOK. An especially economical circuit was developed using only the AC mains as both the high voltage AC supply and the source for the DC supply, by passing the AC mains through capacitive impedance means C1, C2, C3. For the DC supply, the AC supply is followed with DC filtering with the half-wave filter shown in the box. Although the ring frequency is the frequency of the AC mains (60 Hz) rather than the lower 20 Hz frequency commonly used in telephone exchanges, this circuit was found to properly activate all modern faxes, answering machines, and telephones that were tested. The reason is that modern telephone equipment utilize AC-DC conversion of the ring signal and electronic generation of the ring tone rather than a resonating bell relay as in older telephone equipment, and therefore is substantially insensitive to the AC frequency.

The controller utilized to test the viability of the invention was a laptop computer outfitted with an I/O board and programmed in BASIC. A version of the program, entitled "PROGRAM LISTING", is reproduced at the end of the specification for the purpose of illustrating typical control operations found to work successfully with a variety of answering machines and fax machines made by several manufacturers. The same control operations are further expressed in flow chart format in FIGS. 8-10, wherein the corresponding lines of BASIC code are identified by a numeral following the letter "B".

Figure 8:
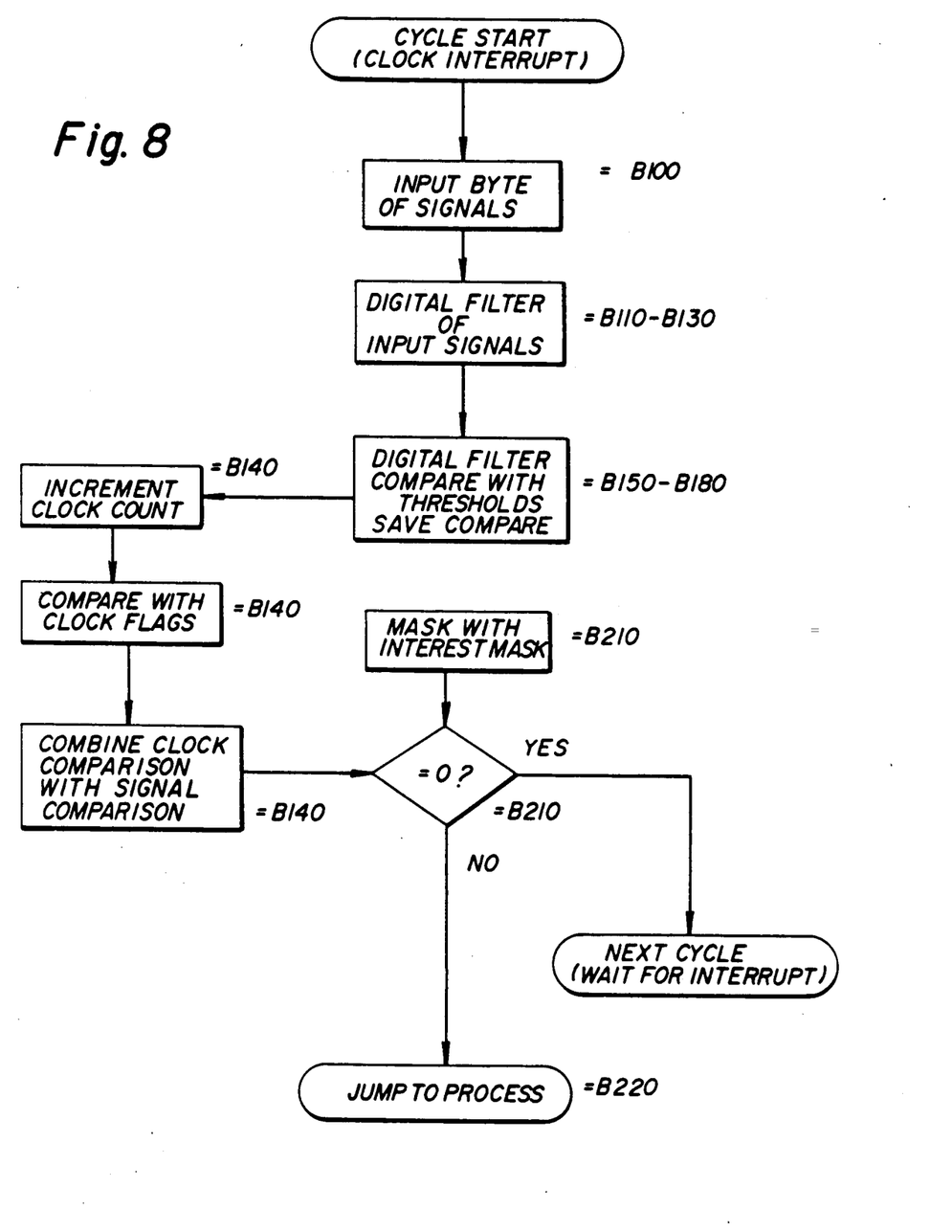
FIGS. 8-10 are flow charts useful in understanding the operation of the preferred embodiment of the invention.

Steps 100-220 (FIG. 8) comprise the main sampling loop of the program. In step 101, a byte of conditions is input from the I/O board. Each bit of the byte (i.e., a power of 2) represents a separate condition. The correspondence of the conditions is as follows:

| | |
|---|---|
| 1 | TDT |
| 2 | |
| 4 | SND |
| 8 | INSND |
| 16 | FOFFH |
| 32 | OFFH |
| 64 | |
| 128 | |

During steps 100–130 and 150–180 the raw input signals are cleaned up to remove spurious noises, and a double byte of signals D% is created having the identification shown clearly in steps 150–180. Included in D% is a flag bit 128 which will be set when the iteration number I reaches a predetermined setting I1 (line 140).

In step 210 the new condition variable is masked by a mask variable DM% to identify which conditions are currently of interest. As the program monitors the conversation between unit (A) and the calling party, the mask variable is changed as the mode of (A) changes. Also, the filter parameters in steps 110 to 120 change in the various modes. In step 210, if no currently interesting conditions are present, the program recycles to sample a new input byte. Otherwise, in step 220 the program jumps to programming steps corresponding to the current detected mode of operation.

The remainder of the program corresponds to the separate actions to be taken in response to the current operating mode. For example, steps 1100 to 1190 (FIGS. 9 and 10) corresponds to the monitoring operation during the OGM. In step 1120, for example, if the new condition variable has bit 2 ON then a calling tone has been detected. The program then jumps to location 1701 where it enters a mode to wait for the end of the OGM prior to actuating the unit (Z2).

Figure 9:
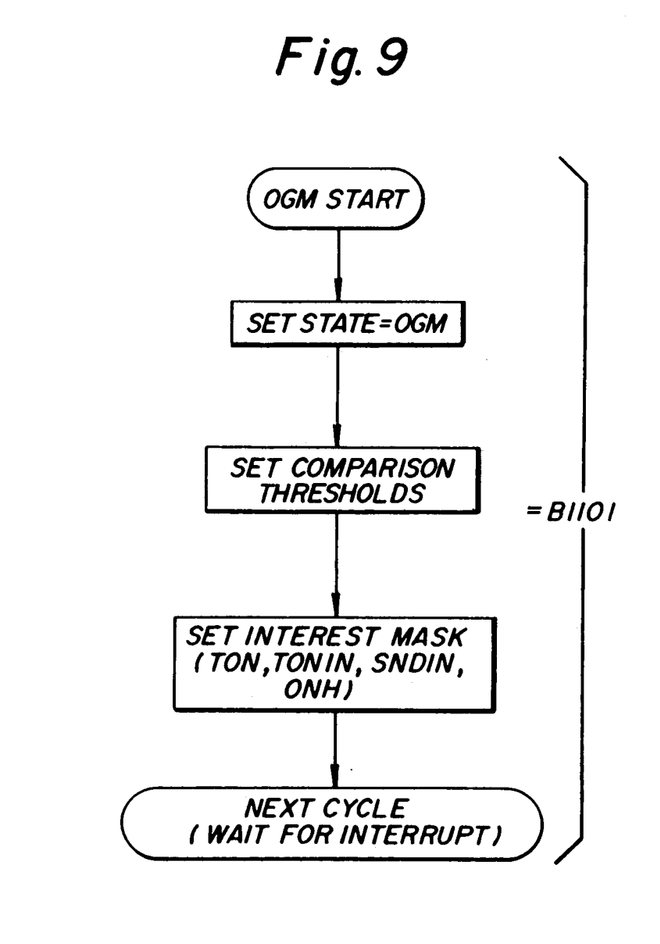
Figure 10:
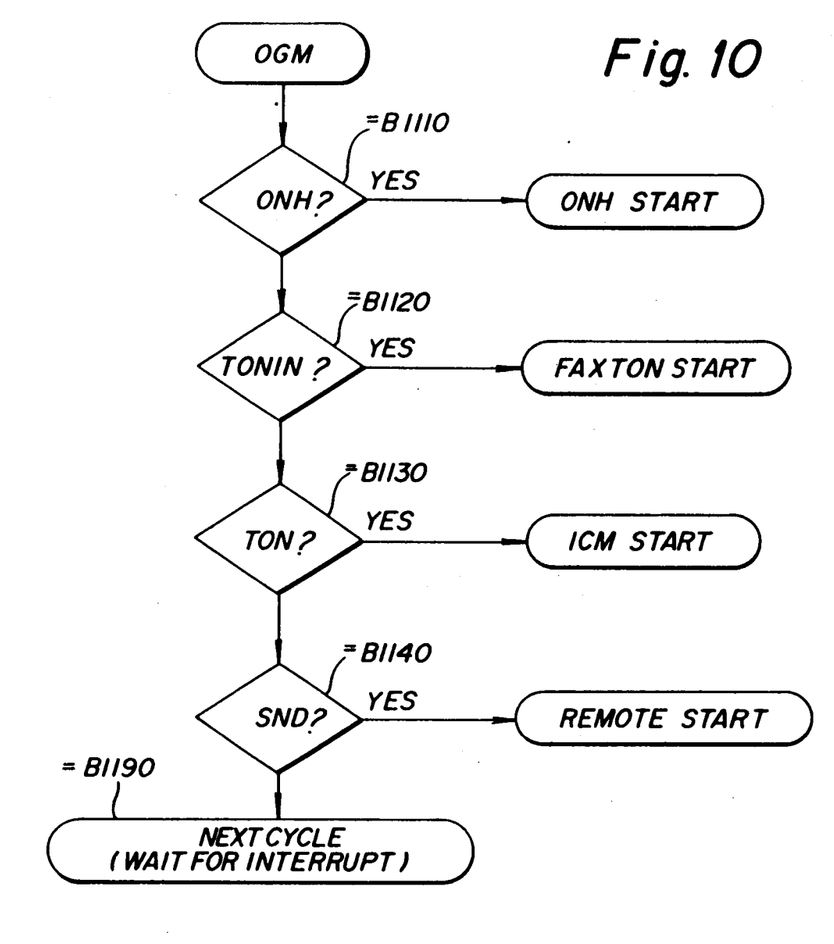

In a typical microprocessor implementation of the above control operations, the microprocessor may be programmed to enter a wait phase following completing the processing of one sensing cycle as shown in FIGS. 8–10, and to resume sensing the next cycle upon receipt of a clock interrupt (e.g., every 2 msec.). Because the controller actually utilized for testing the viability of the invention was running in interpreted BASIC, it took considerable time to perform the various logical steps of the main loop, and therefore the BASIC program proceeds to a new sensing cycle immediately upon completion of the previous cycle.

Flow charts for the additional control operations such as ICM, OGM PAUSE, ICM PAUSE, etc. may easily be constructed from the BASIC program and therefore are not presented herein.

The operation of the ring generator may be seen, for example, in step 1640 wherein the output byte of the I/O board alternately receives the bytes 80 and 144 which alternately turns on RG and LP (since 80=64+16 and 144=128+16) and using the output correspondance appearing below:

| | |
|---|---|
| 1 | Click Generator |
| 2 | |
| 4 | |
| 8 | ANSOFF |
| 16 | NOT FAXON (i.e., FAXOFF) |
| 32 | |
| 64 | RG |
| 128 | LP |

The click generator, as seen in operation in program steps 3100–3130, adds a minor noise to the telephone line to simulate a voice signal for the purpose of defeating the voice-activated timeout (VOX) occuring on some models of answering machines during the ICM; thereby to ensure that device (A) will not become ON HOOK prior to (Z2) becoming OFF HOOK.

Also of interest in this program is the activation of ANSOFF to disconnect the unit (Z1) from the telephone line after the unit (Z2) has been connected as shown in step 1803; however, the disconnection of (Z1) occurs after a time delay "FOR J=0 to 1500 . . . " so that the beginning of any conversation of (Z2) may be recorded by (A) in order to provide an indication to the user calling from a remote location to retrieve telephone calls from (A) that a (Z2) conversation was received (i.e., a facsimile transmission, if (Z2) is a fax machine).

Although the invention has been described heretofore with the first telephone device system (Z1) comprising an automatic answering machine (A), it should be apparent that the invention will function with other telephone devices used in addition to, or in place of, the automatic answering machine described above. If a different telephone device system (Z') is used, it is necessary that the interface apparatus be responsive to the various modes of operation of (Z'), so that it can identify a condition not corresponding to (Z') and can actuate a second telephone device (Z2) such as device (F) above.

For example, in a preferred embodiment of the invention, an automatic answering machine (A), a fax machine (F), and additional telephone sets (T) are connected to the same telephone line. As before, device (F) is initially isolated from the telephone line by a DPDT switch, while the remaining devices (A) and (T) are initially in electrical communication with the telephone line. The additional telephone sets (T) may be remotely located from the devices (A) and (F). When an actuating ring signal arrives from the central office, either the device (A) or one of the devices (T) will be the first to respond. Once the device responds to the actuating signal and becomes OFF HOOK, the actuating signal is terminated. Because the device (A) and the devices (T) have distinct modes of operation, the interface apparatus includes means to determine which device is OFF HOOK, and means to monitor the subsequent conversation with the calling party to identify the various modes of operation of whichever device answered, and any conditions not corresponding to a mode of operation which would indicate the need for initiating connection of (F) to the telephone line.

In the case where a telephone set (T) is the first to respond to the call, the human operator of (T) will usually begin the conversation with short expressions comprising simple human voice signals (e.g., "Hello."). Then, so long as a proper response is received from another human caller, the conversation will continue interactively with increasingly complex sentences of human voice signals. On the other hand, if the caller is not a human caller, but is an automatically dialing computer modem, then there is either no response to (T)'s initial expressions, or the calling tones described above are present. The interface apparatus of this invention responds to either of these conditions lying outside of normal human conversation, by actuating device (F) and connecting it to the telephone line. When the human operator of (T) hears the signal coming from (F), he places (T) in ON HOOK condition, and the conversation continues between (F) and the calling modem.

As a further embodiment of this invention, the interface apparatus may be programmed to allow a degree of normal human conversation between the operator of (T) and the calling party prior to initiating the connection between (F) and the telephone line. In such case, the interface apparatus may be responsive to a particular electronic signal (e.g., a DTMF code), indicating the desire of one of the talking parties to actuate and connect device (F). Or, the interface apparatus may be responsive to a particular spoken word (e.g., "FAX"), or a particular human voice pattern (e.g., "FAX . . . FAX . . . FAX") comprising a repetition of simple human voice signals. As a further alternative, the interface apparatus may simply be responsive to an absence of sound arriving from the calling party.

Although sample embodiments of the invention have been described in detail in order to clearly illustrate the principles of the invention, the scope of the invention should not be limited by the explicit embodiments described herein, but only by the claims following hereafter. Numerous modifications and improvements of these embodiments will be obvious to those skilled in the art, which however rightly belong within the scope of this invention. Among said modifications may be listed replacing portions or entire sections of the described analog hybrid and monitoring circuits with digital processing means such as microprocessing means for identifying the various conditions of interest; also, alternative versions of ring and loop current generating means may be substituted for those illustrated, as is known in the art; in fact, the device (Z2) may be actuated by means other than conventional ring-trip means. In addition, as noted above, the desired monitored conditions of system (Z1) will be dependent on the nature of the modes of operation of (Z1), and may be different from those shown for the case where (Z1) is an automatic answering machine (A) and/or a telephone set (T).

PROGRAM LISTING

```
1 GOTO10000:REM goto setup

100 REM Sense Cycle.

101 A%=INP(128)

110 IF (A% AND 12)=4 THEN S0%=0:S1%=S1%+1 ELSE S0%=S0%+1:IF S0%>SM% THEN S1%=0

115 IF A% AND 4 THEN S2%=0:S3%=S3%+1 ELSE S2%=S2%+1: IF S2%>SM% THEN S3%=0

120 IF A% AND 1 THEN T0%=0:T1%=T1%+1 ELSE T0%=T0%+1:IF T0%>TM% THEN T1%=0

125 IF S0%>30 THEN S0%=30

126 IF S2%>30 THEN S2%=30

127 IF T0%>30 THEN T0%=30

130 IF (A% AND 1) AND (S1%>0) THEN T3%=T3%+1 ELSE T3%=0

140 I=I+1:IF I=11 THEN D%=128 ELSE D%=0

150 IF S1%>SP% THEN D%=D%+8:REM snd in

152 IF S1%<SN% THEN D%=D%+64

155 IF S3%>SQ% THEN D%=D%+4:REM snd

160 IF T1%>TP% THEN D%=D%+1:REM tone

165 IF T3%>TQ% THEN D%=D%+2:REM tone in

170 IF A% AND 32 THEN D%=D%+32 ELSE D%=D%+16:REM of/n hook

180 IF (A% AND 16) THEN D%=(D% OR 256):REM faxon

200 REM

210 C%=D% AND DM%:IF C%=0 THEN 100

220 ON ST% GOTO 1110, 1210, 1310, 1410, 1510, 1610, 1710, 1810, 1910
```

```
1100 REM ogm
1101 PRINT @120,"outgoing   ":ST%=1:SP%=10:SM%=2:SQ%=0:TP%=2:TQ%=2:TM%=1:DM%=27:GOTO100
1110 IF C% AND 16 THEN 1501:REM onh
1120 IF C% AND 2 THEN 1701:REM faxtone
1130 IF C% AND 1 THEN 1401:REM icm ps
1140 IF C% AND 8 THEN IF T1%=0 THEN 1801:REM remote
1190 GOTO100
1200 REM icm
1201 PRINT@120,"incoming   ":TF%=0:K2=-1:S3%=0
1202 ST%=2:SP%=8:SQ%=8:SM%=5:TP%=3:TQ%=2:I1=I+5:I2=I:DM%=406:GOTO100
1210 IF C% AND 16 THEN 1501:REM onh
1215 IF C% AND 256 THEN 1270
1220 IF C% AND 2 THEN S3%=S3%-2:REM faxtone
1230 IF (C% AND 4) THEN OUT 128,16:GOTO 1901
1240 IF C% AND 128 THEN K2=K2+1:GOSUB3100:IF K2>30 THEN 1802 ELSE
     IF (K2 MOD 4)=1THEN OUT128,80:GOTO1202 ELSE OUT128,144:GOTO 1202
1250 GOTO100
1270 IF ((I-I2)<3) THEN 1220
1275 PRINT @120,"fax by silence ";:GOTO1803
1300 REM ogm pause
1301 ST%=3:SN%=1:SQ%=1:SH%=8:DM%=80:GOTO100
1310 IF C% AND 16 THEN 1501:REM onh
1320 IF C% AND 64 THEN 1101:REM ogm
1390 GOTO100
1400 REM icm pause
1401 ST%=4:SN%=1:SQ%=1:SH%=3:DM%=80:GOTO100
1410 IF C% AND 16 THEN 1501:REM onh
1420 IF C% AND 64 THEN 1201:REM icm
1490 GOTO100
1500 REM onhook
1501 OUT128,144:CLS:PRINT@0,EX;"errors";
1502 ST%=5:OH%=0:RC%=0:RG%=0:RP%=4:RT%=0:RM%=30:K2=0:K3=0:I1=I+1:DM%=416:I2=I:GOTO100
1510 IF C% AND 256 THEN IF ((I-I2)>2)THEN 1515 ELSE 1520 ELSE 1520
1515 I2=0:OUT 128,0:PRINT@120,SPACE$(20)
1516 FORJ=0TO30:NEXT:I2=I2+1:IF I2>10 THEN 1501
1517 IF INP(128) AND 32 THEN 1803 ELSE 1516
1520 IF C% AND 32 THEN OH%=OH%+1:IF OH%>4 THEN IF RG%>0 THEN 1301 ELSE 1901 ELSE 1530
1530 IF RG%>0 THEN PRINT @120,"ring det   "; ELSE PRINT @120,"on hook    ";
```

```
1540 IF (A% AND 12)=4 THEN QQ=QQ+1

1545 IF QQ>5 THEN RG%=6 ELSE RG%=0

1550 IF (A% AND 12)=8 THEN QQ=QQ-3:IFQQ<0 THEN QQ=0

1560 I1=I+1:GOTO100

1600 REM getfax

1602 K2=0

1609 ST%=6:DM%=400:I1=I+5:I2=I:GOTO100

1610 IF C% AND 256 THEN 1670

1620 IF C% AND 16 THEN 1501

1625 IF (C% AND 128)=0 THEN 100

1630 IF K3=K3 THEN IF (K2 MOD 2) THEN GOSUB 3100

1640 K2=K2+1:OUT128,16:IF (K2MOD4)=1 THEN OUT128,80 ELSE OUT 128,144

1650 GOTO 1609

1670 IF ((I-I2)<3) THEN 1620 ELSE 1803

1700 REM faxtone

1701 PRINT @120,"faxtone   ";

1709 ST%=7:SN%=1:SQ%=1:SH%=3:DM%=80:GOTO100

1710 IF C% AND 16 THEN 1501:REM onh

1720 IF C% AND 64 THEN IF S3%=0 THEN 1602:REM getfax

1790 GOTO100

1800 REM wait for on hook

1801 PRINT @120, "remote   ";:GOTO1809

1803 PRINT @160, "fax offhook";:OUT128,0:FORJ=0TO1500:NEXT:OUT128,8

1809 ST%=8:DM%=16:GOTO100

1810 GOTO 1501

1900 REM wait for on hook or foh

1901 PRINT @120,"in use   ";

1909 ST%=9:DM%=272:GOTO100

1910 IF C%=256 THEN 1803

1920 GOTO1501
```

```
3114 OUT128,C1%

3115 OUT 128,C0%

3116 OUT 128,C1%

3120 OUT128,C0%

3130 K=K+1:IF K>2 THEN RETURN ELSE3110

4000 REM errors

4001 EX=EX+1

4010 PRINT#1,ERL;EFR I;ST%;A%;T0%;T1%;T2%;T3%;S0%;S1%;S2%;S3%;DM#;D%;TIME$

4020 RESUME 1501

10000 REM setup

10010 TM%=2:SM%=1:SP%=6

10015 CLS:OUT128,16:ON ERROR GOTO4000

10020 OPEN"dump"FOROUTPUTAS1

10099 GOTO1501
```

What is claimed is:

1. In a subscriber's communication terminus for communication with a central office over a communication channel; wherein said terminus comprises a first subsystem (hereinafter "(Z1)") having a plurality of predefined OFF HOOK modes of operation; and a second subsystem (hereinafter "(Z2)");

the method for controlling communication between (Z1), (Z2), and said central office upon reception of a call actuating signal from said central office comprising:

passing said call actuating signal to (Z1) while blocking said call actuating signal from reaching (Z2);

monitoring said communication channel to detect an OFF HOOK condition indicating that (Z1) is in one of said OFF HOOK modes of operation;

monitoring said communication channel to detect mode-characteristic signals identifying each of said OFF HOOK modes of operation of (Z1) as they occur; while monitoring said communication channel to detect an off-mode condition not corresponding to at least one of said OFF HOOK modes of operation and in response thereto, placing (Z2) in communication with said central office.

2. The method of claim 1 for controlling communication between (Z1), (Z2), and said central office, wherein:

(Z1) includes an automatic answering machine (hereinafter "(A)");

said modes of operation of (Z1) include an OGM mode in which a recorded message is transmitted, accompanied by a signal indicating the end of said OGM mode of operation; and an ICM mode wherein an incoming signal is recorded; and said mode-characteristic signals include said signal indicating the end of said OGM mode.

3. In the method of claim 2 for controlling communication between (Z1), (Z2), and said central office; wherein (A) has VOX termination during said ICM mode if a signal is not received from said central office; the method for extending said ICM mode, comprising: introducing a VOX-defeating signal onto said communication channel during said ICM mode.

4. The method of claim 1 for controlling communication between (Z1), (Z2), and said central office, including the additional step of removing (Z1) from communication with said central office after a time delay subsequent to said step of placing (Z2) in communication with said central office.

5. The method of claim 4 for controlling communication between (Z1), (Z2), and said central office; wherein (Z1) includes an automatic answering machine (hereinafter "(A)") having an ICM mode wherein signals arriving from said central office are recorded in memory means; and said time delay is sufficient to allow signals from (Z2) to be recorded in said memory means.

6. The method of claim 1 for controlling communication between (Z1), (Z2), and said central office, wherein:

(Z1) includes a telephone device designed for interacting with a human caller;

said central office relays at least one calling tone indicating that a data apparatus is connected to said communication channel; and said off-mode condition includes said at least one calling tone.

7. The method of claim 1 for controlling communication between (Z1), (Z2), and said central office, wherein:

(Z1) includes a first telephone device system (hereinafter "(Z11)") and a second telephone device system (hereinafter "(Z12)") connected in parallel; and (Z11) and (Z12) connected in parallel collectively exhibit said plurality of predefined OFF HOOK modes of operation.

8. The method of claim 7 for controlling communication between (Z1), (Z2), and said central office, wherein at least one of said systems (Z11) and (Z12) includes a telephone set capable of use by a human operator.

9. The method of claim 7 for controlling communication between (Z1), (Z2), and said central office, wherein said modes of operation include at least two of the following three modes:
- a first mode wherein (Z11) is OFF HOOK while (Z12) is not OFF HOOK;
- a second mode in which (Z11) is not OFF HOOK while (Z12) is OFF HOOK; and
- a third mode in which (Z11) is OFF HOOK and (Z12) is OFF HOOK.

10. The method of claim 1 for controlling communication between (Z1), (Z2), and said central office, wherein:
- (Z1) includes a telephone set capable of use by a human operator, and
- said modes of operation include a first mode in which a first pattern of human voice signals is present on said communication channel, and a second mode in which a second pattern of human voice signals is present on said communication channel, wherein said second pattern is electrically discernable from said first pattern.

11. The method of claim 10 for controlling communication between (Z1), (Z2), and said central office, wherein said off-mode condition includes a presence on said communication channel of a non-human voice-band signal.

12. The method of claim 10 for controlling communication between (Z1), (Z2), and said central office, wherein said off-mode condition includes an absence of sound arriving via said central office during said first mode wherein said first pattern of human voice signals is present.

13. The method of claim 10 for controlling communication between (Z1), (Z2), and said central office, wherein said off-mode condition includes a presence on said communication channel of a pattern of human voice signals, electrically discernable from said second pattern of human voice signals.

14. The method of claim 10 for controlling communication between (Z1), (Z2), and said central office, wherein said off-mode condition includes the existence of said first mode for a period of time greater than a predefined period of time.

15. In the method of claim 1 for controlling communication between (Z1), (Z2), and said central office, wherein (Z2) includes a telephone device that requires an actuating signal having a first part and a second part, the improvement comprising:
- the additional step of passing said first part of said actuating signal to (Z2) at a time during said steps of monitoring said communication channel; and
- said step of placing (Z2) in communication with said central office includes the step of passing said second part of said actuating signal to (Z2).

16. The method of claim 1 for controlling communication between (Z1), (Z2), and said central office, including the additional steps of:
- monitoring (Z2) for an OFF HOOK condition at times other than when said subscriber's terminus is in active communication with said central office, and
- placing (Z2) in communication with said central office responsive to detecting said OFF HOOK condition;

whereby (Z2) may be placed in communication with said central office for the purpose of answering and originating calls.

17. The method of claim 1 for controlling communication between (Z1), (Z2), and said central office, wherein (Z2) includes an electronic telephone device capable of automatically obtaining an OFF HOOK condition responsive to an actuating signal.

18. The method of claim 17 for controlling communication between (Z1), (Z2), and said central office, wherein (Z2) includes an automatic computer modem apparatus.

19. The method of claim 18 for controlling communication between (Z1), (Z2), and said central office, wherein (Z2) includes a facsimile machine.

20. In the method for controlling communication between a subscriber's first telephone device system (hereinafter "(Z1)") having an automatic answering machine (hereinafter "(A)"), a subscriber's second telephone device system (hereinafter "(Z2)"), having an automatic computer modem apparatus (hereinafter "(F)"), and a central office over a communication channel; and wherein (Z1) has at least the following predefined OFF HOOK modes of operation:
- an OGM mode in which a recorded message is transmitted, accompanied by a signal indicating the end of said OGM mode of operation; and
- an ICM mode wherein an incoming signal is recoreded;

wherein, in response to a call actuating signal arriving from said central office, said method for controlling communication between (Z1), (Z2), and said central office comprises:
- passing said actuating signal to (Z1) while blocking said actuating signal from reaching (Z2);
- monitoring said communication channel for an OFF HOOK condition indicating that (Z1) has answered said actuating signal;
- monitoring said communication channel to detect a condition indicating that (Z2) should be placed in communication with said central office; and in response thereto;
- placing (Z2) in communication with said central office;

the improvement comprising:
- detecting mode-characteristic signals identifying each of said modes of operation of (Z1) as they occur, wherein said mode characteristic signals include said signal indicating the end of said OGM mode of operation; and
- said step of monitoring said communication channel to detect a condition indicating that (Z2) should be placed in communication with said central office comprises detecting at least one off-mode condition not corresponding to said modes of operation of (Z1).

21. In an interface apparatus for controlling the communication between a subscriber's first communication subsystem (hereinafter "(Z1)") having a plurality of predefined OFF HOOK modes of operation, a subscriber's second communication subsystem (hereinafter "(Z2)"), and a central office over a communication channel; said interface apparatus comprising:
- means for passing a call actuating signal from said central office to (Z1) while blocking said actuating signal from reaching (Z2);

means for monitoring said communication channel for an OFF HOOK condition indicating that (Z1) has answered said call actuating signal;

means for monitoring said communication channel to detect a condition indicating that (Z2) should be placed in communication with said central office; and means responsive thereto for placing (Z2) in communication with said central office;

the improvement comprising:

means for detecting mode-characteristic signals identifying each of said modes of operation of (Z1) as they occur, wherein said means for monitoring said communication channel to detect a condition indicating that (Z2) should be placed in communication with said central office comprises means for detecting an off-mode condition not corresponding to said modes of operation of (Z1).

22. In a subscriber's communication terminus for communication with a central office over a communication channel, wherein said terminus comprises a first subsystem (hereinafter "(Z1)") including an automatic answering machine (hereinafter "(A)"), and a second subsystem (hereinafter "(Z2)"), wherein (Z1) has a plurality of OFF HOOK modes of operation including at least the following two modes:

an OGM mode in which a recorded message is transmitted, accompanied by a signal indicating the end of said OGM mode of operation; and an ICM mode wherein an incoming signal is recorded;

the method for controlling communication between (Z1), (Z2), and said central office upon reception of a call actuating signal from said central office comprising:

passing said actuating signal to (Z1) while blocking said actuating signal from reaching (Z2);

monitoring said communication channel for an OFF HOOK condition indicating that (Z1) has answered said actuating signal;

monitoring said communication channel to detect mode-characteristic signals identifying each of said OFF HOOK modes of operation of (Z1) as they occur; while monitoring said communication channel to detect an off-mode condition not corresponding to at least one of said OFF HOOK modes of operation and in response thereto, placing (Z2) in communication with said central office.

23. The method of claim 22 for controlling communication between (Z1), (Z2), and said central office, including the additional step of removing (Z1) from communication with said central office after a time delay subsequent to said step of placing (Z2) in communication with said central office.

24. The method of claim 22 for controlling communication between (Z1), (Z2), and said central office, wherein:

said modes of operation include a REMOTE CONTROL mode actuated by a control signal sent via said central office during said OGM mode; and said mode-characteristic signals include said control signal.

25. The method of claim 22 for controlling communication between (Z1), (Z2), and said central office, wherein said off-mode condition includes an absense of sound arriving via said central office during a first time period of said ICM mode.

26. The method of claim 22 for controlling communication between (Z1), (Z2), and said central office, wherein:

(Z1) includes a telephone set capable of use by a human operator, and said modes of operation include a first mode in which a first pattern of human voice signals is present on said communication channel, and a second mode in which a second pattern of human voice signals is present on said communication channel, wherein said second pattern is electrically discernable from said first pattern.

27. The method of claim 26 for controlling communication between (Z1), (Z2), and said central office, wherein said off-mode condition includes a presence on said communication channel of a non-human voice-band signal.

28. The method of claim 26 for controlling communication between (Z1), (Z2), and said central office, wherein said off-mode condition includes an absence of sound arriving via said central office during said first mode wherein said first pattern of human voice signals is present.

29. The method of claim 26 for controlling communication between (Z1), (Z2), and said central office, wherein said off-mode condition includes the existence of said first mode for a period of time greater than a predefined period of time.

30. The method of claim 26 for controlling communication between (Z1), (Z2), and said central office, wherein said off-mode condition includes a presence on said communication channel of a pattern of human voice signals, electrically discernable from said second pattern of human voice signals.

* * * * *